(12) United States Patent
Ryu et al.

(10) Patent No.: US 11,928,578 B2
(45) Date of Patent: Mar. 12, 2024

(54) SPARSITY-AWARE NEURAL PROCESSING UNIT FOR PERFORMING CONSTANT PROBABILITY INDEX MATCHING AND PROCESSING METHOD OF THE SAME

(71) Applicant: POSTECH Research and Business Development Foundation, Pohang-si (KR)

(72) Inventors: Sungju Ryu, Busan (KR); Jae-Joon Kim, Pohang-si (KR); Youngtaek Oh, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 707 days.

(21) Appl. No.: 17/108,927

(22) Filed: Dec. 1, 2020

(65) Prior Publication Data
US 2021/0303980 A1 Sep. 30, 2021

(30) Foreign Application Priority Data
Mar. 30, 2020 (KR) .................. 10-2020-0038359

(51) Int. Cl.
*G06F 5/06* (2006.01)
*G06F 7/76* (2006.01)
(Continued)

(52) U.S. Cl.
CPC ............... *G06N 3/063* (2013.01); *G06F 5/06* (2013.01); *G06F 7/76* (2013.01); *G06F 17/15* (2013.01);
(Continued)

(58) Field of Classification Search
CPC ........ G06F 17/15; G06F 17/153; G06F 17/16; G06F 7/74; G06F 7/76; G06F 7/78;
(Continued)

(56) References Cited

U.S. PATENT DOCUMENTS

2018/0129935 A1 5/2018 Kim et al.
2019/0370645 A1* 12/2019 Lee .................. G06N 3/063
2022/0012593 A1* 1/2022 Huang .............. G06N 3/045

FOREIGN PATENT DOCUMENTS

KR 10-2018-0052063 A 5/2018

OTHER PUBLICATIONS

I. Fesiuk, A FIFO Buffer Implementation, downloaded from https://eneus.github.io/blog/a_fifo_buffer_implementation/ 2019 (Year: 2019).*
(Continued)

*Primary Examiner* — Emily E Larocque
(74) *Attorney, Agent, or Firm* — Morgan, Lewis & Bockius LLP

(57) ABSTRACT

A method of processing of a sparsity-aware neural processing unit includes receiving a plurality of input activations (IA); obtaining a weight having a non-zero value in each weight output channel; storing the weight and the IA in a memory, and obtaining an input channel index comprising a memory address location in which the weight and the IA are stored; and arranging the non-zero weight of each weight output channel according to a row size of an index matching unit (IMU) and matching the IA to the weight in the IMU comprising a buffer memory storing the input channel index.

7 Claims, 6 Drawing Sheets

(51) Int. Cl.
  *G06F 17/15* (2006.01)
  *G06F 17/16* (2006.01)
  *G06N 3/047* (2023.01)
  *G06N 3/063* (2023.01)
(52) U.S. Cl.
  CPC ............ *G06F 17/16* (2013.01); *G06N 3/047* (2023.01); *G06F 5/065* (2013.01)
(58) Field of Classification Search
  CPC ... G06F 5/06; G06F 5/065; G06F 5/08; G06F 5/10; G06F 5/12; G06N 3/04; G06N 3/0464; G06N 3/047; G06N 3/063
  See application file for complete search history.

(56) References Cited

OTHER PUBLICATIONS

S. Ryu et al., SPRITE: Sparsity-Aware Neural Processing Unit with Constant Probability of Index-Matching, EDAA 2021 (Year: 2021).*
Office Action dated Apr. 27, 2022, issued in corresponding Korean Patent Application No. KR 10-2020-0038359, 4 pages.
Zhang, Jie-Fang, et al. "SNAP: A 1.67-21.55, TOPS/W Sparse Neural Acceleration Processor for Unstructured Sparse Deep Neural Network Inference in 16nm CMOS," 2019 Symposium on VLSI Circuits Digest of Technical Papers, 2019, C306-C307, JSAP, IEEE.

* cited by examiner

SPARSITY-AWARE NEURAL PROCESSING UNIT FOR PERFORMING CONSTANT PROBABILITY INDEX MATCHING AND PROCESSING METHOD OF THE SAME

CROSS-REFERENCE TO RELATED APPLICATION(S)

This application claims benefit of priority to Korean Patent Application No. 10-2020-0038359 filed on Mar. 30, 2020 in the Korean Intellectual Property Office, the disclosure of which is incorporated herein by reference in its entirety.

TECHNICAL FIELD

The present disclosure relates to a sparsity-aware neural processing unit for performing constant probability index matching regardless of a density of an IA and a weight and a processing method of the same.

BACKGROUND

In the prior art illustrated in FIGS. 1A and 1B, a convolution neural network uses an input activation output by applying a weight filter as an input to an output layer and requires several matrix multiplications. Among the same, a sparse convolution neural network employs a calculation method in which a number of matrices are multiplied with only non-zero values by pruning when an IA is a zero value.

That is, the sparse convolutional neural network removes zero values (0) by approximating values close to 0, among the IA and weights, thereby leaving only the non-zero values to find the index with the non-zero values and load the values into a corresponding index. Afterward, a calculation method that performs multiplication and accumulation is performed. This enables a significant reduction in a number of memory communications and a number of multiplications for the neural network algorithm, whereby matrix multiplications between IAs and weights may be effectively performed.

However, according to the prior art, densities of the IA and the weight matrices appear to be different for each layer. In order to effectively perform the matrix multiplication between the IAs and the weights using the sparse matrix, there is a need for multiplication to maintain a certain probability, regardless of a density change of the IA/weight matrix for each layer.

In other words, there is an emerging need of an invention for maintaining constant performance of a model with sparse variables.

SUMMARY

An aspect of the present disclosure is to provide a sparsity-aware neural processing unit, configured to align weight input and output channels in a matrix such that a utilization of a multiplier is maintained at a certain percentage, regardless of a density change of an IA and a weight, as the utilization of the multiplier rapidly changes according to the density of a matrix of IA and weight, and a processing method of the same.

According to an example embodiment of the present disclosure, a method of processing of a sparsity-aware neural processing unit includes receiving a plurality of input activations (IA); obtaining a weight having a non-zero value in each weight output channel; storing the weight and the IA in a memory, and obtaining an input channel index comprising a memory address location in which the weight and the IA are stored; and arranging the non-zero weight of each weight output channel according to a row size of an index matching unit (IMU) and matching the IA to the weight in the IMU comprising a buffer memory storing the input channel index.

Further, the IMU includes a comparator array, a weight buffer memory and an IA buffer memory, wherein, in a boundary of the comparator array, the IA buffer memory storing the IA input channel index is arranged in a columnar direction and the weight buffer memory storing the non-zero weight input channel index is arranged in a row direction, so as to match the weight and the IA.

In the weight buffer memory, the non-zero weight of each weight output channel is arranged in ascending order, and the non-zero weights are arranged in a next output channel when a number of the non-zero weight exceeds an input channel size of the weight output channel. Alternately, the IA buffer memory one-to-one matches the input channel indices of the IA to pixel-dimensions and arranges the pixel dimensions in ascending order.

According to an example embodiment, the method further includes determining, in the weight buffer memory, an average number n of the non-zero input channel index of each weight output channel according to a density d of the weight and the IA; and determining an average weight output channel number m of the weight buffer memory according to the average number n of the non-zero input channel index, wherein n and m are determined by the following formulae: $n=s*d$, where s is an input channel size of the weight output channel; and $m=s'/n$, where s' is a row size of the IMU. An average number Pm of the weight input channel index to which each IA input channel index matches per CLK cycle is maintained using the following formula, regardless of the IA/weight density d: $Pm=d*m=d*(s'/n)=d*(s'/s/d)=s'/s$, where Pm is maintain to be 1 when $s=s'$.

According to another example embodiment, the method further includes indicating a flag signal on a matched index of the IA and the weight and transmitting a maximum of p matched indices to a p-way priority encoder; and consecutively delivering the matched IA/weight pair to a FIFO one by one by the p-way priority encoder received with the maximum of p matched IA/weight pairs.

According to another example embodiment, the method further includes deleting the weights, among the weights stored in the weight buffer memory, delivered to the FIFO by the p-way priority encoder and rearranging weights, among the weights stored in the weight buffer memory, not delivered to the FIFO by the p-way priority encoder.

As another aspect, a processing element may include an IMU comprising a buffer memory comprising a weight buffer memory configured to store a non-zero value of a weight and an IA buffer memory configured to store a non-zero value of an IA, and a comparator array configured to match an index of the non-zero value of the weight to an index of the non-zero value of the IA; a p-way priority encoder received with a maximum of p matched IA/weight pairs in the comparator array; and a FIFO received with the matched IA/weight pairs from the p-way priority encoder one by one to deliver the same to a multiplier one by one.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1A:
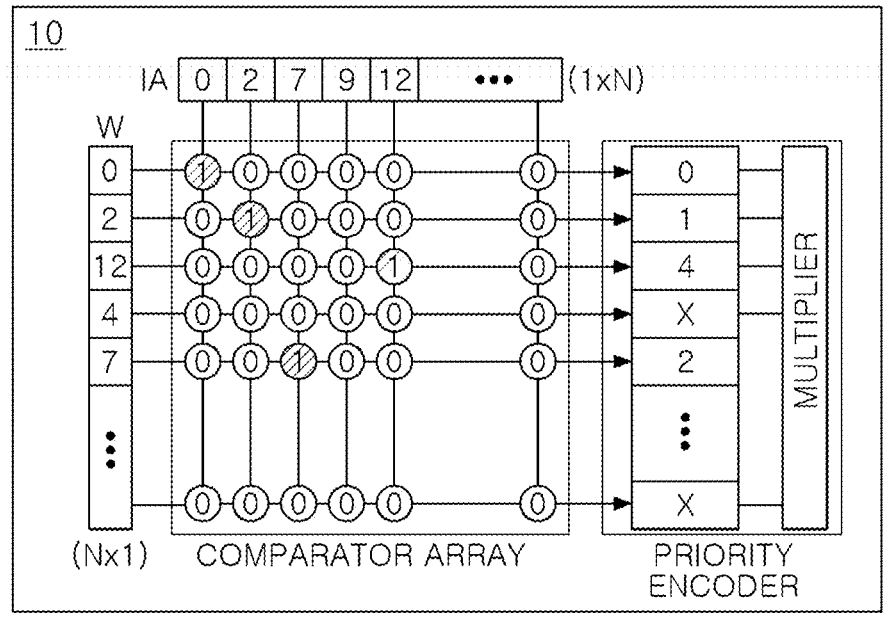
FIGS. 1A and 1B are graphs illustrating a utilization change of a multiplier according to an IA/weight density and a conventional sparsity-aware neural processing unit.
Figure 1B:
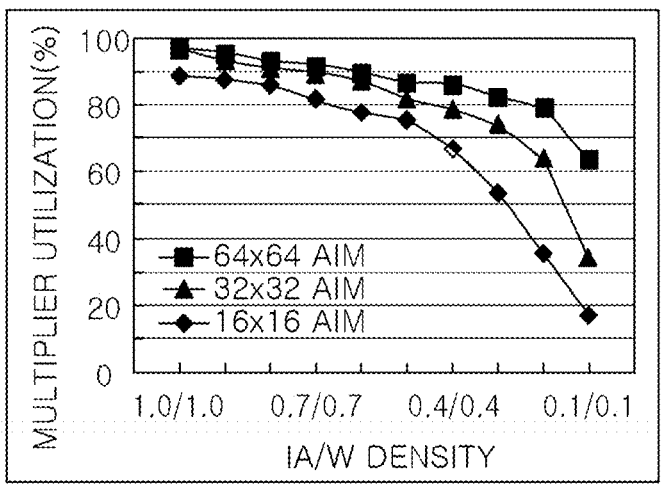

Referring to FIGS. 1A and 1B, a conventional index matching unit (IMU) 10 involves matrix-aligning an activation index IA and a weight W by (1×N) and (N×1), respectively, to match an index of the IA and the weight. The (1×N) matrix of the IA is matched to 0 (W1), 2 (W2), 12 (W3), . . . , WN in said order, and a matched index of the IA/weight pair is delivered to a priority encoder one by one at the most. A multiplier received the matched IA/weight pair index from the priority encoder to perform computations.

In the weights (N×1) matrix-aligned, a number of non-zero weights varies according to a weight density. As the weight density is reduced, the number of the non-zero weights is reduced to be less than N.

When a weight is matched to an IA while having a zero value deleted from the weights and non-zero values remained, a number of the matched IA/weight pairs is low when a matrix of the IA and the weight has a low density, thereby decreasing a number of an IA/weight pairs supplied to a multiplier from the IMU and reducing efficiency of the multiplier. In contrast, when the matrix of the IA and the weight has a high density, the number of the IA/weight pairs exceeds capacitance of the multiplier, thereby leading to the results that the matched IA/weight pair is not delivered to the multiplier and accumulated in the IMU in every CLOCK cycle and that the multiplier cannot process all at once, thereby causing bottleneck.

Referring to FIG. 1B, when the IA/weight density is 1.0/1.0, the multiplier can be utilized by almost 100% when sizes of a comparator array are 64×64, 32×32, and 16×16. When a weight density is higher than 1.0, the matched IA/weight pairs continue to accumulate while consuming entire performance of the multiplier, and the matched pairs delivered to the priority encoder by the IMU are accumulated, thereby stalling the IMU.

In contrast, when the IA/weight density is 0.1/0.1, only 10% of the performance of the multiplier can be utilized as the size of the comparator array is reduced, resulting in extremely low computational efficiency.

In addition, a plurality of matchings may be performed between the weights for a single IA depending on the IA/weight matrix density. When the priority encoder is used, the IMU can deliver only a single matched IA/weight pair per cycle. In this regard, IA/weight indices unmatched until a plurality of the matched IA/weight pairs are delivered to the multiplier need to be in standby in the IMU during a plurality of cycles, thereby deteriorating efficiency of the entire processing unit.

Hereinbelow, the example embodiments of the present disclosure will be described in detail. According to an example embodiment, a matching probability between the IA and the weight can be maintained to be constant such that constant efficiency of the multiplier can be maintained without a dramatic change depending on the IA/weight matrix density.

Figure 2:
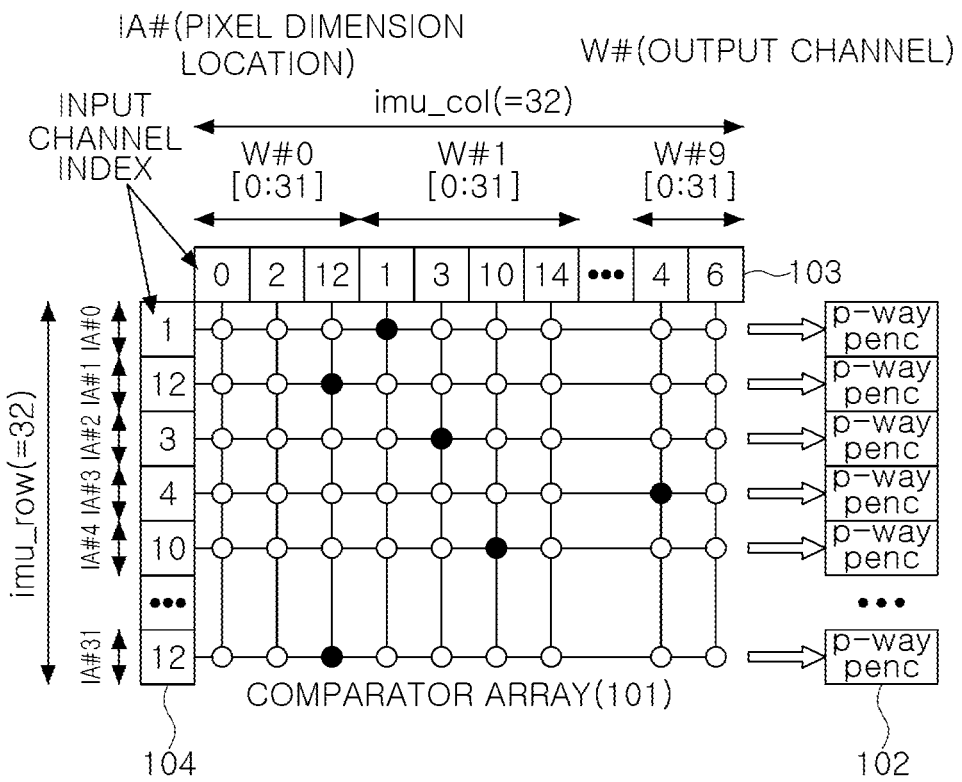
FIG. 2 is a diagram illustrating an index matching unit (IMU) and a p-way priority encoder according to an example embodiment.

FIG. 2 is a diagram illustrating an IMU 100 according to an example embodiment. FIG. 2 illustrates an IA/weight matrix alignment.

As illustrated in FIG. 2, an IMU 100 includes an IA buffer memory 104 and a weight buffer memory 103 configured to store an IA and a weight, respectively, and may include a comparator array 101 configured to compare and match IA/weight indices.

The comparator array 101 may vary depending on a user's setting. Hereinbelow, the comparator array will be described while assuming a size thereof to be 32×32. However, this is merely an exemplary embodiment and should not limit the scope of the claims.

As illustrated in FIG. 2, the data elements of 1, 12, 3, 4, 10, . . . , 12 aligned in the IA buffer memory 104 in a (32×1) matrix represent input channel index values of the IA. Each row corresponds to a depth of an input in which an IA is positioned in a neural network layer. The "n" in IA #n refers to a pixel-dimension position, where n may be a number of 0 to 31.

In addition, the data elements of 0, 2, 12, 1, 3, 10, 14, . . . , 4, 6 aligned in the weight buffer memory 103 in a (1×32) matrix represent input channel index values of the weights aligned with non-zero values remained after approximating the zero value to 0 and removing the same, representing the non-zero weights as a matrix structure. The "m" in W #m refers to an index of an output channel, where m may be determined depending on a density of the weight. A process for determining "m" depending on the weight density will be described with reference to FIGS. 3 to 5.

The weight matrix arranges the non-zero values from low to high for each weighted output channel and compares input channel indices in the IA/weight matrices to match any matching values thereof.

When the IA and the weight match to each other, the matched IA/weight pair is delivered to the p-way priority encoder 102. The matched IA/weight pair may be one or more. In the case of one matched IA/weight pair, the one is delivered to the p-way priority encoder 102, whereas in the case of a plurality of the IA/weight pairs, a maximum of p pairs can be delivered to the p-way priority encoder 102 all at once.

According to an example embodiment, the method may include receiving a plurality of IAs, obtaining a weight having a non-zero value in each weight output channel, storing the weight and the IA in a memory, and obtaining an input channel index including a memory address location in which the weight and the IA are stored, and aligning the non-zero weight of each weight output channel according to a row size of an index matching unit (IMU) and matching the AI to the weight in the IMU including a buffer memory storing the input channel index.

Further, the IMU includes a comparator array, a weight buffer memory 103 and an IA buffer memory 104, wherein, in a boundary of the comparator array, the IA buffer memory 104 storing the IA input channel index is arranged in a columnar direction and the weight buffer memory 103 storing the non-zero weight input channel index is arranged in a row direction, so as to match the weight and the IA.

Specifically, in the weight buffer memory 103, the non-zero weights of each weight output channel are arranged in ascending order, and the non-zero weights is arranged in a next output channel when a number of the non-zero weight exceeds an input channel size of the weight output channel. The IA buffer memory 104 one-to-one matches the input channel indices of the IA to pixel-dimensions and arranges the pixel dimensions in ascending order.

Figure 3:
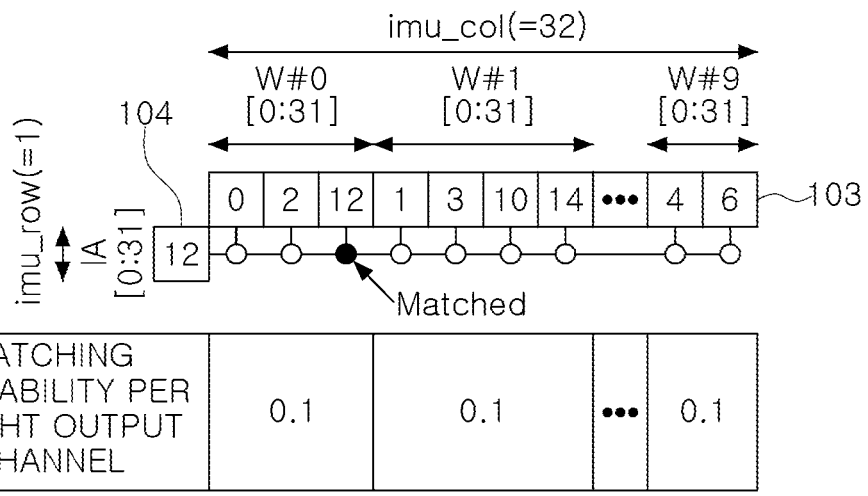
FIG. 3 is a diagram illustrating a processing process of outputting a matched IA/weight pair by an IMU according to an example embodiment according to an IA/weight density.
Figure 4:
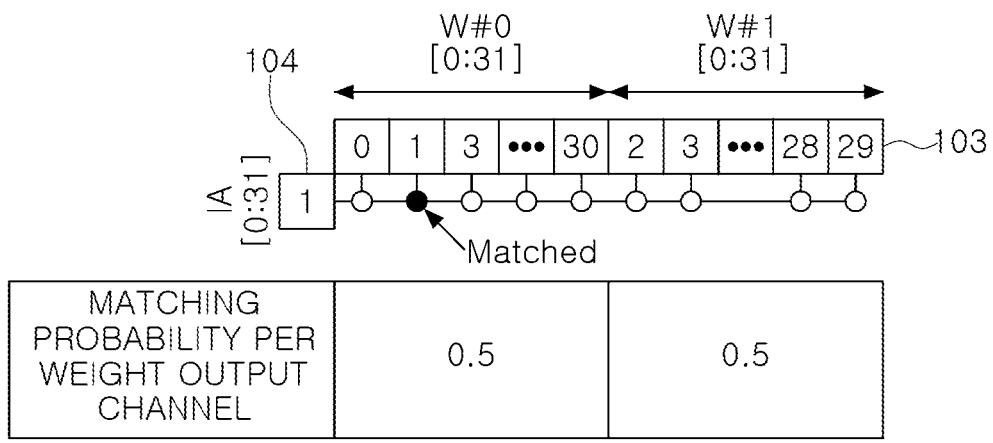
FIG. 4 is a diagram illustrating a processing process of outputting a matched IA/weight pair by an IMU according to another example embodiment according to an IA/weight density.
Figure 5:
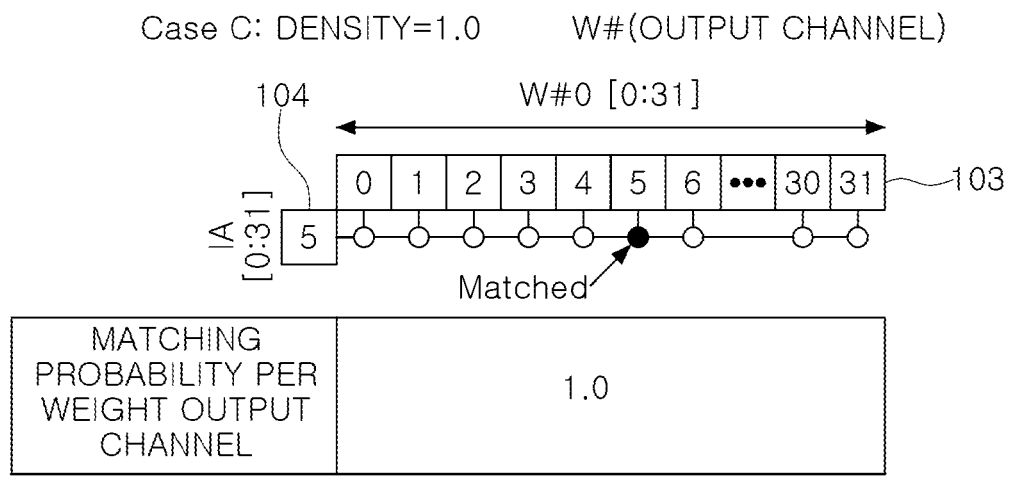
FIG. 5 is a diagram illustrating a processing process of outputting a matched IA/weight pair by an IMU according to another example embodiment according to an IA/weight density.

FIGS. 3 to 5 illustrate a probability that the IMU 100 outputs the matched IA/weight pair depending on the IA/weight density in the case in which the IA and the weight are aligned in a matrix according to FIG. 2. Further, for convenience of description of the IA, only one input index channel will be indicated among 0 to 31 input index channels in FIGS. 3 to 5.

FIG. 3 illustrates that the weight density is 0.1 (d=0.1), which means that a probability that a non-zero value is present in the 0 to 31 weight input channel indices is 1/10. That is, in the case in which a density of the non-zero value is 0.1 in a weight input channel having a size of 32, the weight non-zero value may be present in the number of 32*0.1=3.2. However, this is an average probability, and thus, the non-zero value does not necessarily need to be present in the number of 3.2. As illustrated in FIG. 3, there are three non-zero values of W #0, which are 0, 2 and 12, and four input channel indices are present for W #1, which are 1, 3, 10 and 14. In the case of W #9, two channel input indices, which are 4 and 6, are present.

Further, according to an example embodiment, in a 32×32 matrix between the IA and the weight, the matrix row may be filled with 32 weight non-zero values. Non-zero values, among [0:31]-size weights, remained through the approximation method are aligned, and the W #0, W #1, . . . , W #9 matrix rows are filled in the order of lower output channel index, and 32 weight channel input indices, which is the matrix size, can be filled.

As a result, the non-zero input channel index value of the weight W #m, in which 3.2 non-zero values are present in average, is aligned in accordance with the matrix size such that 10 of the weight output channels (0 to 9) can be aligned.

The above description, however, is merely a probability, and an average of 10 weight output channels can be aligned, which is unnecessary. Accordingly, the claims are not limited thereto.

In this regard, as illustrated in FIG. 3, there are 10 weight output channels (W #m) having a probability of 0.1 of being matched to the input channel index 12 of IA #1 while having a total of the 10 weight output channels, W #0 to W #9, aligned. As 0.1*10=1, matching between the IA and the weight can be performed with a probability of 1 in the IA/weight matrix (1×32).

To prevent a matching probability between the IA and the weight from being reduced due to a low weight density and efficiency of the multiplier from being rapidly reduced, an overall IMU matrix matching probability is maintained to be constant by filling the weight output channel with the non-zero weights as much as the size of the matrix. This enables to maintain constant efficiency of the multiplier.

FIG. 4 illustrates that the weight density is 0.5 (d=0.5), which means that a probability that a non-zero value is present in the 0 to 31 weight input channel indices is 5/10. That is, in the case in which a density of the non-zero value is 0.5 in a weight input channel having a size of 32, the weight non-zero value may be present in the number of 32*0 0.5=16. However, this is an average probability, and thus, the non-zero value does not necessarily need to be present in the number of 16. As illustrated in FIG. 4, there are 16 non-zero values of W #0, which are 0, 1, 3, . . . , 30, and 16 input channel indices are present for W #1, which are 2, 3, . . . , 28, 29. This indicates that two output channels were used to fill the 1×32 matrix.

That is, according to an example embodiment, in a 32×32 matrix between the IA and the weight, the matrix row may be filled with 32 weight non-zero values. Non-zero values, among [0:31]-size weights, remained through the approximation method are aligned, and the W #0 and W #1 matrix rows are filled in the order of lower output channel index, and 32 weight channel input indices, which is the matrix size, can be filled.

As a result, the non-zero input channel index value of the weight W #m, in which 16 non-zero values are present on average, is aligned in accordance with the matrix size, such that 2 of the weight output channels (0 to 1) can be aligned.

The above description, however, is merely a probability, and an average of 2 weight output channels can be aligned, which is unnecessary. Accordingly, the claims are not limited thereto.

In this regard, as illustrated in FIG. 4, there are 2 weight output channels (W #m) having a probability of 0.5 of being matched to the input channel index 1 of IA #0 while having a total of the 2 weight output channels, W #0 and W #1, aligned. As 0.5*2=1, one IA/weight pair can be matched in average in the IA/weight matrix (1×32).

To prevent a matching probability between the IA and the weight from being reduced due to a low weight density and efficiency of the multiplier from being rapidly reduced due to too many matchings of the IA and the weights, which leads to bottleneck, an overall IMU matrix matching probability is maintained to be constant by filling the weight output channel with the non-zero weights as much as the size of the matrix. This enables to maintain constant efficiency of the multiplier.

FIG. 5 illustrates that the weight density is 1.0 (d=1.0), which means that a probability that a non-zero value is present in the 0 to 31 weight input channel indices is 10/10. That is, in the case in which a density of the non-zero value is 1.0 in a weight input channel having a size of 32, the weight non-zero value may be present in the number of 32*1.0=32. However, this is an average probability, and thus, the non-zero value does not necessarily need to be present in the number of 32. As illustrated in FIG. 5, there are 32 non-zero values of W #0, which are 0, 1, 2, 3, 4, 5, 6, . . . , 30, 31. This indicates that one output channels was used to fill the 1×32 matrix.

That is, according to an example embodiment, in a 32×32 matrix between the IA and the weight, the matrix row may be filled with 32 weight non-zero values. Non-zero values, among [0:31]-size weights, remained through the approximation method are aligned, and the W #0 matrix row is filled in the order of lower output channel index. In this regard, 32 weight channel input indices, which is the matrix size, can be filled using only one weight output channel as all input channel indices may be non-zero values in the case in which the weight density is 1.

As a result, the non-zero input channel index value of the weight W #m, in which 32 non-zero values are present in average, is aligned in accordance with the matrix size such that a total of 1 weight output channel can be aligned using the weight output channel 0.

The above description, however, is merely a probability, and an average of 1 weight output channel can be aligned, which is unnecessary. Accordingly, the claims are not limited thereto.

In this regard, as illustrated in FIG. 5, there are 1 weight output channels (W #m) having a probability of 1.0 of being matched to the input channel index 5 of IA while having a total of the 1 weight output channel, W #0, aligned. As 1.0*1=1, one IA/weight pair can be matched in average in the IA/weight matrix (1×32).

To prevent efficiency of the multiplier from being rapidly reduced due to too many matchings of the IA and the weights, which leads to bottleneck, an overall IMU matrix matching probability is maintained to be constant by filling the weight output channel with the non-zero weights as much as the size of the matrix. This enables to maintain constant efficiency of the multiplier.

That is, according to an example embodiment, in the weight buffer memory 103, the average number n of the non-zero input channel indices of each weight output channel is determined depending on the IA/weight density d, and the average number m of the weight output channels of the weight buffer memory 103 is determined depending on the average number n of the non-zero input channel indices, where n and m are determined with Formula 1 below:

$$n=s*d, m=s'/n,$$  [Formula 1]

where s is an input channel size of the weight output channel, and s' is a IMU row size.

As a result, an average number Pm of the weight input channel index to which each IA input channel index matches per CLK cycle is maintained using the following formula, regardless of the IA/weight density d:

$Pm=d*m=d*(s'/n)=d*(s'/s/d)=s'/s$, where Pm is maintain to be 1 when $s=s'$.

In other words, as illustrated in FIGS. 3 to 5, an average number Pm that the weight matches to one IA even when the weight density varies is maintained to be 1 (=d*m=d*s/n=d*s/(s*d)) thereby enabling to maintain the efficiency of the multiplier when delivering the matched IA/weight pair to a next step. As described with reference to FIG. 6A below, the p-way priority encoder, the FIFO and the multiplier are disposed to correspond to a single IA. This indicates that when a single IA and a single weight are matched at a certain probability, overall efficiency of the multiplier is maintained, resulting in no difference in computation performance according to the weight density.

Figures 6A, 6B:
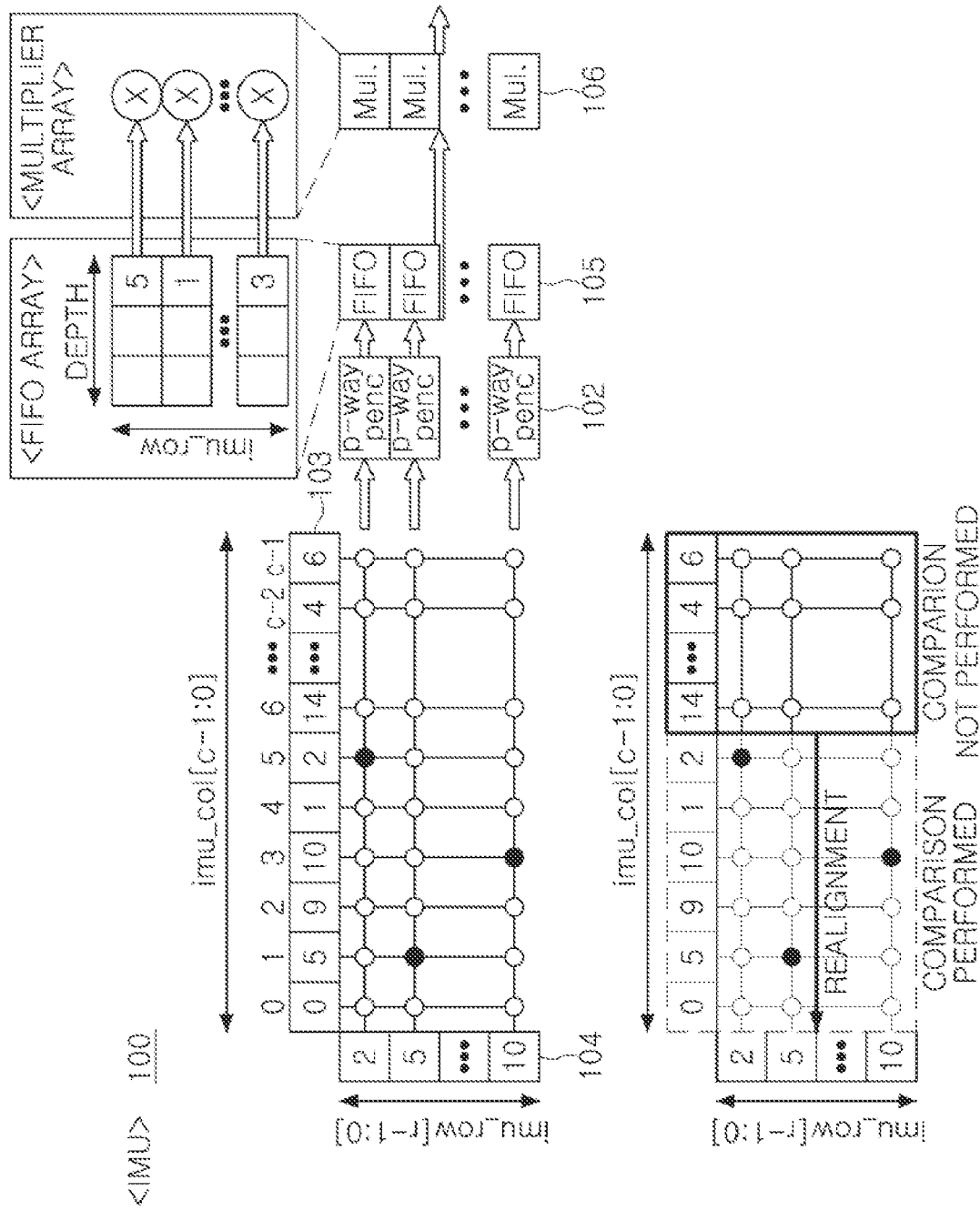
FIGS. 6A and 6B are diagrams illustrating a processing element including an IMU according to an example embodiment and a processing process of a matched IA/weight pair of the processing element.

FIGS. 6A and 6B are diagrams illustrating a processing element including an IMU 100 according to an example embodiment and a processing process of a matched IA/weight pair of the processing element.

As illustrated in FIG. 6A, a processing element according to an example embodiment may include an IMU 100 including a comparator array 101 in which IA and weight matrices are aligned, a p-way priority encoder 102 allocated to each row of the IMU 100, a first-in-first-out (FIFO) 105 and a multiplier 106.

Specifically, an IA buffer memory 104 and a weight buffer memory 103 including IAs and weights, respectively, are aligned in a row and a column such that the IMU 100 configured to compare and match the IA and weight indices through the comparator array 101 and deliver matched IA/weight pairs to the p-way priority encoder 102.

As illustrated in FIGS. 3 to 5, a matched IA/weight pair can be generated in each row regardless of a density, and a plurality of the matched IA/density pairs can be generated. As a single cycle is consumed to deliver the matched IA/weight pair to the priority encoder, it takes a lot of time to deliver the plurality of the matched IA/weight pairs one by one, thereby decreasing efficiency of the processing unit. Accordingly, the p-way priority encoder 102 is used to deliver up to p number of the plurality of the matched IA/weight pairs to the p-way priority encoder 102 at once, thereby reducing consumption of the cycles.

The p-way priority encoder 102 delivers the received maximum p number of the matched IA/weight pairs to the FIFO 105 one by one, and the FIFO 105 may store the same by varying the depth in the order in which they are received. The FIFO 105 delivers the received matched IA/weight pairs to the multiplier 106 one by one such that the multiplier 106 performs computations.

As illustrated in FIG. 6B, the weights used in the index matching in the comparator array 101 are deleted and those not used may be realigned in order while the matched IA/weight pairs are delivered to the p-way priority encoder 102.

A maximum number of the matched IA/weight pairs, which can be delivered to the p-way priority encoder 102, is p. When more than p number of the matched IA/weight pairs are generated, p matched IA/weight pairs are first delivered to the p-way priority encoder 102, and the remaining matched IA/weight pairs need to wait for several cycles until delivered to the p-way priority encoder 102. This degrades the efficiency of the processing element.

Accordingly, according to an example embodiment, when p matched IA/weight pairs, which can be processed by the p-way priority encoder 102, are generated, the matched IA/weight pairs are first delivered to the p-way priority encoder 102, and weight rows can be realigned such that the weights delivered to the FIFO by the p-way priority encoder 102 are deleted and those remained and not delivered to the FIFO by the p-way priority encoder 102 can be subject to re-matching.

As previously described, the processing element can serve to prevent degradation of the performance of the multiplier due to delay in post-treatment even when the IA/weight matching probability is maintained to be constant.

Figure 7:
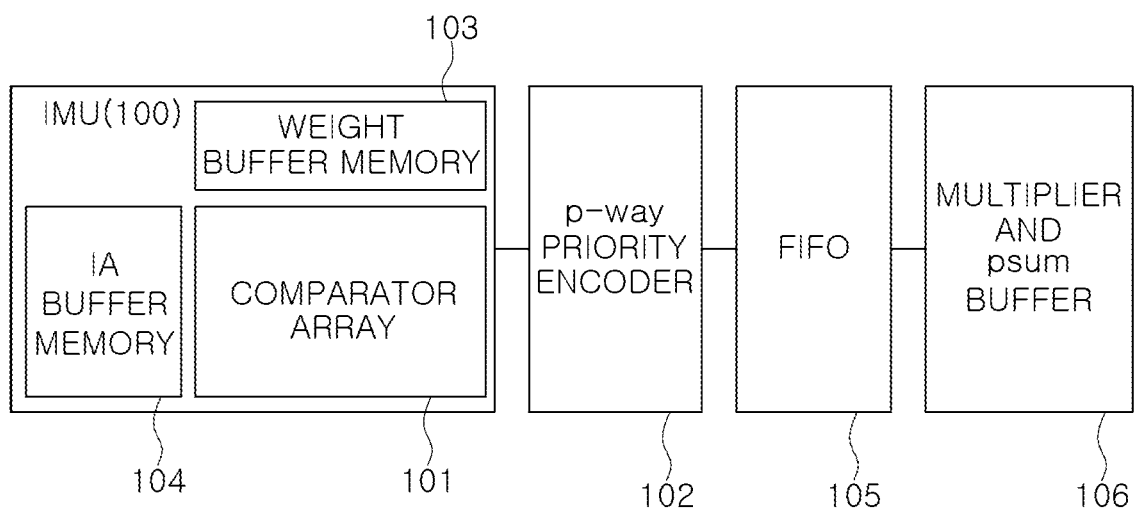
FIG. 7 is a block diagram of a processing element performing a processing process according to an example embodiment.

FIG. 7 is a block diagram illustrating a configuration of the processing element described in FIGS. 6A and 6B.

The processing element may include the IMU 100, the p-way priority encoder 102, the FIFO 105, the multiplier and the psum buffer 106. The IMU 100 may include the weight buffer memory 103 configured to store weight input channel indices, the IA buffer memory 104 configured to store IA input channel indices, and the comparator array 101 configured to compare and match the IAs and weights stored in the weight buffer memory 103 and the IA buffer memory 104.

The p-way priority encoder 102 delivers the received maximum p number of the matched IA/weight pairs to the FIFO 105 one by one, and the FIFO 105 may store the same by varying the depth in the order in which they are received to deliver the received matched IA/weight pairs to the multiplier 106.

The multiplier 106 utilizes the received matched IA/weight pairs to perform computations, and computation results of a multiplier array including the multiplier corresponding to each row is sent to the psum buffer 106 to store a summed result.

The processing element may include one or more processors (e.g., microprocessor or a central processing unit (CPU)), a graphic processing unit (GPU), an application specific integrated circuit (ASIC), or combinations of other processors. As an example, the processing element may include other storing or computing source/devices (e.g., a buffer, a resistor, a control circuit, or the like), providing additional processing options for performing one or more of the determinations and computations described herein.

In some example embodiments, the processing element executes programmed commands stored in a memory, allowing a controller and a computing system to perform one or more of the functions described herein. The memory may include one or more non-transitory machine-readable storage media. The non-transitory machine-readable storage media may include a solid state memory, magnetic and optical disks, a portable computer diskette, a random access memory (RAM), a read-only memory (ROM), an erasable programmable ROM (e.g. EPROM, EEPROM or flash memory), or any other type of medium capable of storing information.

In general, the processing element is an exemplary computational unit or tile and may include additional hardware structures for performing computations related to a multi-dimensional data structure such as a tensor, a matrix, and/or a data array. In some example embodiments, input activation values may be preloaded into a memory for an activation structure, and weights may be preloaded using data values received from an external or higher level control device associated with a neural network hardware.

According to the present disclosure, a matched IA/weight pair cannot be sufficiently supplied to an IMU, thereby decreasing a utilization of a multiplier when a matrix density of the IA and the weight is low due to weight output channel alignment. When the density is high, the multiplier cannot perform all computations on the matched IA/weight pair, thereby preventing bottleneck and maintaining the utilization of the multiplier.

In the specification and the drawings, the same or similar reference numerals represent the same or similar structures.

One example embodiment of the present disclosure is merely an exemplary embodiment and should not be limited to the numerals mentioned above.

While the example embodiments have been shown and described above, it will be apparent to those skilled in the art that modifications and variations could be made without departing from the scope of the present invention as defined by the appended claims.

What is claimed is:

1. A method of processing of a sparsity-aware neural processing unit, comprising:
   receiving a plurality of input activations (IAs);
   obtaining a plurality of weights having a non-zero value in each weight output channel;
   storing the plurality of weights and the plurality of IAs in a memory, and obtaining input channel indices comprising a memory address location in which the plurality of weights and the plurality of IAs are stored; and
   arranging the plurality of weights of each weight output channel according to a row size of an index matching unit (IMU) and matching the plurality of IAs to the plurality of weights in the IMU storing the input channel indices,
   wherein the IMU comprises a comparator array and a buffer memory,
   wherein the buffer memory comprises a weight buffer memory and an input activation (IA) buffer memory,
   wherein, in a boundary of the comparator array, the IA buffer memory storing IA input channel indices is arranged in a columnar direction and the weight buffer memory storing weight input channel indices is arranged in a row direction so as to match the plurality of weights and the plurality of IAs, and
   wherein, in the weight buffer memory, the plurality of weights of each weight output channel are arranged in ascending order, and the plurality of weights are arranged in a next weight output channel when a number of the plurality of weights exceeds an input channel size of a respective weight output channel.

2. The method of claim 1, wherein the IA buffer memory one-to-one matches the input channel indices of the plurality of IAs to pixel dimensions and arranges the pixel dimensions in ascending order.

3. The method of claim 1, further comprising:
   determining, in the weight buffer memory, an average number n of the weight input channel indices of each weight output channel according to a density d of the plurality of weights and the plurality of IAs; and
   determining an average weight output channel number m of the weight buffer memory according to the average number n of the weights input channel indices,
   wherein n and m are determined by the following formulae:

$n=s*d$, where $s$ is an input channel size of a respective weight output channel; and $m=s'/n$, where $s'$ is a row size of the IMU.

4. The method of claim 3, wherein an average number Pm of the weight input channel indices to which the IA input channel indices match per clock (CLK) cycle is maintained using the following formula, regardless of the density d:

$Pm=d*m=d*(s'/n)=d*(s'/s/d)=s'/s$, where $Pm$ is maintained to be 1 when $s=s'$.

5. The method of claim 3, further comprising:
   indicating a flag signal on a matched index of one of the plurality of IAs and one of the plurality of weights and transmitting a maximum of p matched indices to a p-way priority encoder; and
   consecutively delivering matched IA/weight pair to a first-in-first-out (FIFO) one by one by the p-way priority encoder configured to receive the maximum of p matched indices.

6. The method of claim 5, further comprising:
   deleting the weights, among the weights stored in the weight buffer memory, delivered to the FIFO by the p-way priority encoder and rearranging weights, among the weights stored in the weight buffer memory, not delivered to the FIFO by the p-way priority encoder.

7. A sparsity-aware neural processing unit, comprising:
   an index matching unit (IMU) comprising a buffer memory comprising a weight buffer memory configured to store weight input channel indices having a non-zero value of a weight and an input activation (IA) buffer memory configured to store IA input channel indices having input activations (IAs), and a comparator array configured to match an index of the non-zero value of the weight to an index of one of the IAs;

a p-way priority encoder configured to receive a maximum of p matched IA/weight pairs in the comparator array; and a first-in-first-out (FIFO) configured to receive matched IA/weight pairs from the p-way priority encoder one by one to deliver the matched IA/weight pairs to a multiplier one, wherein the IMU is configured to remove a weight delivered to the FIFO by the p-way priority encoder from the weight buffer memory and rearrange weights not delivered to the FIFO by the p-way priority encoder, as the maximum of the p matched IA/weight pairs are delivered to the p-way priority encoder.

* * * * *